United States Patent [19]

Bisonaya et al.

[11] 4,357,957
[45] Nov. 9, 1982

[54] SINGLE LEVER FAUCET—SLIDING WEDGE OPERATION MECHANISM

[75] Inventors: Rudy Y. Bisonaya, Elmhurst; Gerald J. Farrell, Oaklawn, both of Ill.

[73] Assignee: Elkay Manufacturing Company, Broadview, Ill.

[21] Appl. No.: 220,265

[22] Filed: Dec. 23, 1980

[51] Int. Cl.³ ............................................. F16K 11/14
[52] U.S. Cl. .................................... 137/636.1; 74/53;
137/454.6; 137/607; 251/257
[58] Field of Search ............... 74/53, 54, 55; 137/607,
137/636.1, 636.2, 454.2, 454.6; 251/258

[56] References Cited
U.S. PATENT DOCUMENTS

| 3,275,011 | 9/1966 | Berezansky | 251/331 |
| 3,348,742 | 10/1967 | Assalit | 251/331 |
| 3,543,799 | 12/1970 | Hayman | 137/636.2 |
| 3,548,878 | 12/1970 | Brigandi | 137/636.1 |
| 3,958,601 | 5/1976 | Schmitt | 137/636.2 |
| 4,051,869 | 10/1977 | Holt et al. | 137/636.1 |
| 4,226,260 | 8/1979 | Schmitt | 137/454.6 |
| 4,301,830 | 11/1981 | Keller | 137/636.1 |

Primary Examiner—George L. Walton
Attorney, Agent, or Firm—Leydig, Voit, Osann, Mayer and Holt, Ltd.

[57] ABSTRACT

A single lever mixing faucet is disclosed of the type generally used as a household sink faucet. The lever is operated by hand and controls individual diaphragm valves by plungers which are actuated by a cam operated by the lever, the cam having a wedge actuator connected to be moved by the lever in two orthogonally related directions and combinations thereof upon manual movement of the lever. The wedge actuator is mounted for essentially planar movement without rotation and has flat cam surfaces engaging flat ends of said plunger to move the plungers and control the rate of flow of water as well as the relative proportions of hot and cold water.

13 Claims, 24 Drawing Figures

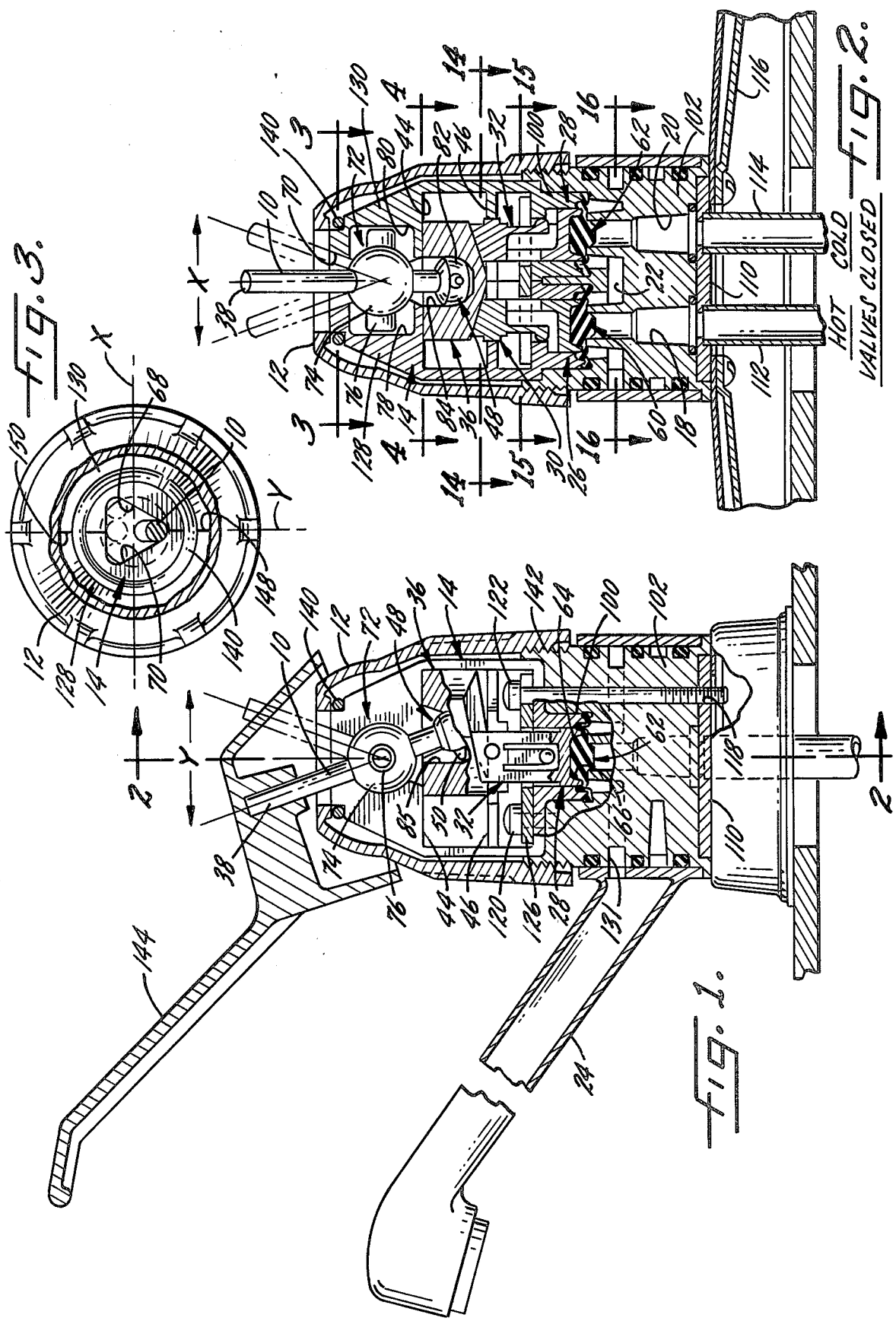

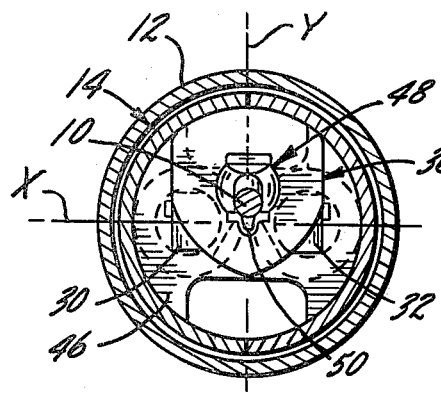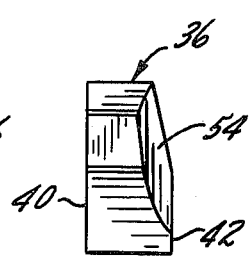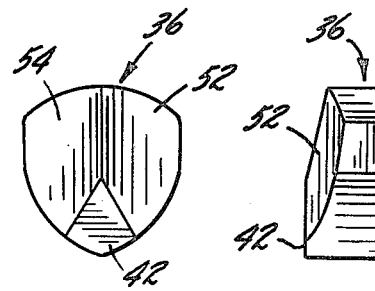
fig. 4.    fig. 5.    fig. 6.    fig. 7.
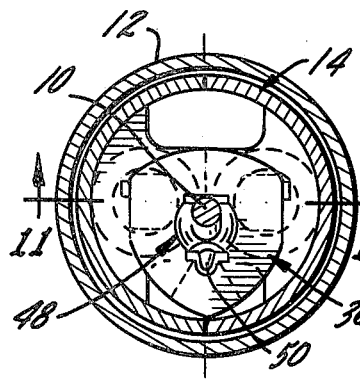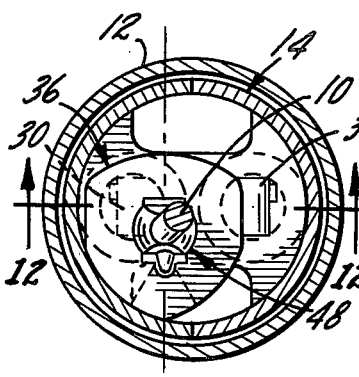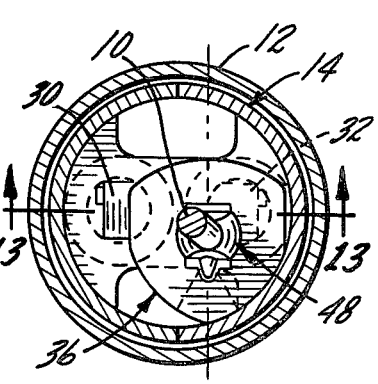
fig. 8.    fig. 9.    fig. 10.
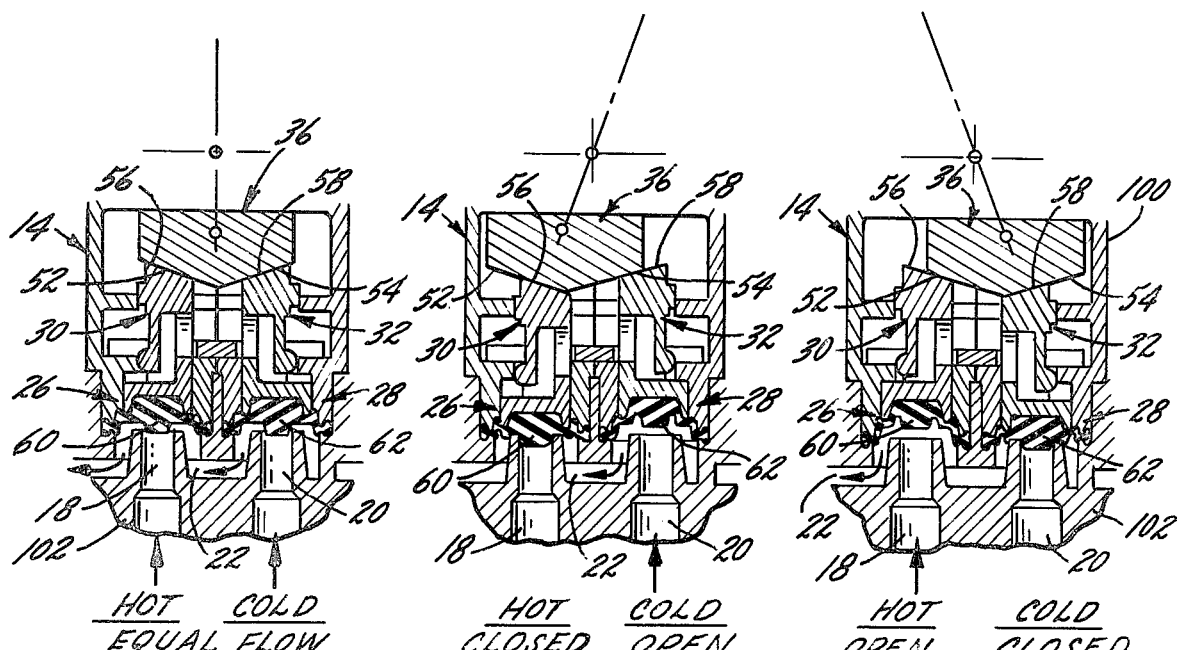
HOT   COLD
EQUAL FLOW
HOT   COLD
CLOSED OPEN
HOT   COLD
OPEN  CLOSED
fig. 11.    fig. 12.    fig. 13.

FULL FLOW

EQUAL FLOW

PARTIAL FLOW

VALVE CLOSED

SINGLE LEVER FAUCET—SLIDING WEDGE OPERATION MECHANISM

This invention relates to actuators and housings for faucets, and more particularly to actuators and housing structures for hot and cold water mixing faucets.

The primary object of the present invention is to provide an improved actuating mechanism for parallel plunger valves of such single lever mixing faucets.

It is a further object of this invention to provide such an actuating mechanism having cam means in the form of a wedge actuator having flat cam surfaces and wherein all mating surfaces are preferably substantially flat and engage over large areas to increase part life by reducing wear.

It is a related object to provide cam actuating means utilizing such a wedge actuator to provide a multi-faced cam moving in only one plane for simultaneously operating cam surfaces of the parallel plunger valves, to provide an operating mechanism which is simple to manufacture yet provides more precise control over the mixing of hot and cold water by the valves.

Another object is to provide a housing structure which will prevent tolerance build-up in such faucets which generally occurs when the housing parts are stacked in one direction for assembly.

Additionally, it is more specific object of this invention to provide a housing structure for supporting the single lever of a faucet such that the lever will have a positive feel to it when manually operated as well as remaining stationary once a desired setting has been made.

Another object of this invention is to provide an improved diaphragm valve for liquid flow lines having a construction which enables more precise control over the flow rate through the valve.

Another object is to provide an improved valve closure configuration for a diaphragm valve which enables more precise control of the flow rate through the valve by movement of a faucet handle, when such valve is used in water faucets or the like.

In the drawings, wherein the preferred embodiment of the device is shown:

FIG. 1 is a sectional view taken longitudinally through the faucet showing the lever assembly, the wedge actuator, and the upper and lower housing assemblies;

FIG. 2 is a front sectional view taken longitudinally through the faucet showing the lever assembly, the wedge actuator, the parallel plungers, and the hot and cold inlet ports;

FIG. 3 is a top view of the faucet showing the triangular opening limiting the lever movement taken from FIG. 2 along line 3—3;

FIG. 4 is a sectional top view showing the relationship between the wedge actuator, the upper housing body, and the inlet ports taken from FIG. 2 along line 4—4;

FIG. 5 is a side view of the wedge actuator exposing the hot side cam face;

FIG. 6 is a bottom view of the wedge actuator showing the triangular bottom surface and both flat cam surfaces;

FIG. 7 is a side view of the wedge actuator exposing the cold side cam face;

FIG. 8 is a plan view showing the lever and wedge actuator positioned such that both plungers are in the fully raised position permitting maximum water flow;

FIG. 9 is a plan view showing the lever and wedge actuator positioned such that the hot side plunger is fully closed and the cold side plunger is fully raised;

FIG. 10 is a plan view showing the lever and wedge actuator positioned such that the cold side plunger is fully closed and the hot side plunger is fully raised;

FIG. 11 is a front sectional view showing both plungers in the fully raised position taken from FIG. 8 along line 11—11;

FIG. 12 is a front sectional view showing the hot side plunger fully closed and the cold side plunger fully open taken from FIG. 9 along line 12—12;

FIG. 13 is a front sectional view showing the cold side plunger fully closed and the hot side plunger fully open taken from FIG. 10 along line 13—13;

Figure 14:
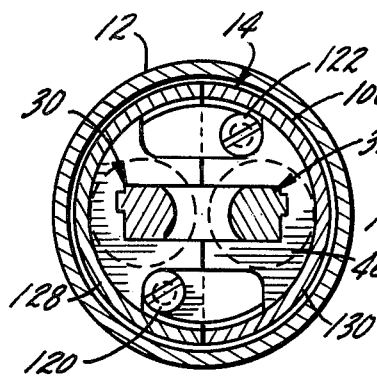
FIG. 14 is a sectional view showing the top of the bolts which fasten the upper and lower housing bodies together taken from FIG. 2 along line 14—14.
Figure 15:
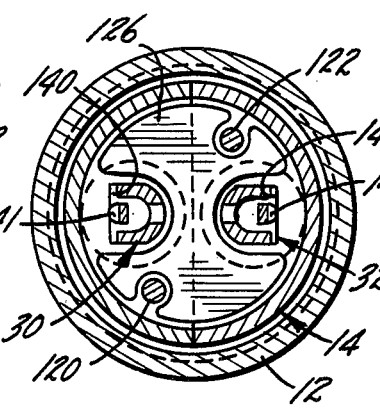
FIG. 15 is a sectional view showing the metal retainer plate taken from FIG. 2 along line 15—15.
Figure 16:
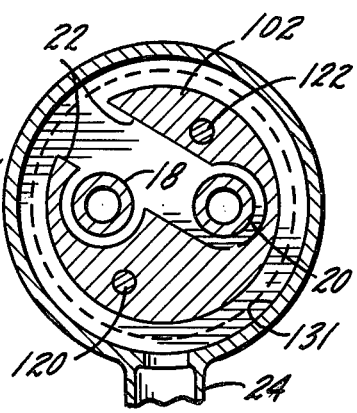
FIG. 16 is a sectional view showing the lower housing body and the inlet ports taken from FIG. 2 along line 16—16.

With reference to the drawings and in particular FIGS. 1, 2 and 3, a single lever mixing faucet is disclosed of the type generally used as a household sink faucet. The lever 10 is operated by hand for controlling the rate of flow of water from the faucet as well as the mix of hot and cold water and is positioned atop a dome unit 12, which can be made of chrome-plated steel, or similar material to give the unit an attractive appearance. Encased within the outer dome 12 is the housing 14 which supports the lever 10 and contains the components of the mixing faucet including hot and cold valve means for controlling water flow from inlet ports 18, 20 to a mixing chamber 22 from which the mixed water is discharged through a spout 24.

In carrying out the invention the preferred valve means includes individual diaphragm valves 26, 28 generally of the kind described in U.S. Pat. No. 4,203,464, but having certain improvements to improve the flow characteristics of the valve means, operated by plungers 30, 32 slidably mounted in the housing 14, which are actuated by cam means operated by the lever 10.

In accordance with the present invention, and with further reference to FIGS. 4 through 13, the cam means includes a wedge actuator 36 connected to be moved by the lever 10 in two orthogonally related directions upon manual movement of the end 38 of the lever which extends from the housing 14. The wedge actuator 36 is mounted in the housing 14 for essentially planar movement and functions to transmit movement to the pair of plungers 30, 32 positioned over the hot and cold water inlet ports 18, 20. By longitudinal movement of the plungers 30, 32 the wedge actuator 36 controls the rate of flow of water as well as the relative proportions of hot and cold water.

For restricting the wedge actuator 36 to planar movement, the wedge actuator 36 has a top surface 40 and a bottom surface 42 which are substantially parallel to each other. The top and bottom surfaces 40, 42 interface with pressure wall 44 and housing surface 46, said housing surfaces 44, 46 being parallel and restraining said wedge actuator and limiting its sliding movement to only one plane. Additionally, the wedge actuator 36 is prevented from relative rotating as it slides along its fixed plane by the modified ball assembly 48 which is located between the wedge actuator 36 and the lower end of lever 10. The lever 10 is also prevented from relative rotation because of its connection with housing 14.

For translating the planar sliding movement of the wedge member 36 to longitudinal displacement of the plungers 30, 32, as shown in FIGS. 5, 6 and 7, preferably substantially flat, oppositely inclined cam surfaces 52, 54 are provided on the bottom of the wedge actuator 36 which engage face-to-face, preferably substantially flat follower surfaces 56, 58 on the top ends of the plungers 30, 32. Attention is drawn to the fact that these cam surfaces 52, 54 on the wedge actuator 36 are oppositely inclined in two (X, Y) directions; the forward-rearward (Y) inclination controls the rate of flow of inlet water while the lateral (X) inclination controls the proportions of hot and cold water entering the mixing chamber 22. By utilizing flat cam and follower surfaces which are in face-to-face engagement, and restricting movement of the wedge actuator to one plane, and thereby maintaining the cam and follower surfaces in face-to-face engagement throughout the full range of movement of the wedge actuator, the wear on these cam and follower surfaces is minimized, and whatever wear does occur is uniformly distributed over these cooperating surfaces so as to obtain indefinite life for these cam parts.

Accordingly, as the wedge actuator 36 is moved by the lever 10, the plungers 30, 32 are displaced longitudinally in the housing 14. The valves 26, 28, which function to control inlet flow in response to movement of the plungers 30, 32, include individual diaphragms 60, 62 clamped at their periphery in the housing 14 and having central raised portions 64 received in the lower ends 66 of the plungers 30, 32 which are tubular for that purpose. The plungers 30, 32 are substantially parallel to each other, FIG. 2, and have slidable movement in the longitudinal direction. By movement of the diaphragms 60, 62 relative to valve seats formed at the inlet ports 18, 20, flow through the inlet ports is controlled. The diaphragms 60, 62 and plungers 30, 32 are forced away from inlets ports 18, 20 by the hydraulic pressure of the water as the wedge actuator 36 shifts to allow such movement, and are displaced toward the inlet ports 18, 20 by the camming action of the wedge actuator 36 as it shifts in the reverse direction.

Turning to FIG. 2, both hot and cold diaphragm valves 26, 28 are illustrated in their fully closed position, such that any movement of the wedge actuator 36 away from its position with the valves fully closed (shown in FIG. 10) will allow upward movement of one or the other, or both plungers 30, 32, through the sliding action of the mating cam surfaces. More particularly, as the lever 10 is moved manually toward the right hand position illustrated in dashed lines in FIGS. 2 and 3, the lever 10 by engagement with the right hand edge 68 of the triangular opening 70 in the housing 14 through which the lever 10 extends, will be caused to move in a rearward direction. This combination of movement to the right and to the rear of the lever 10 will cause complementary (left-forward) movement of the opposite ball end 48 of the lever 10 from the position of FIG. 10 to the position of FIG. 9.

Movement of the ball end 48 of the lever 10 forward, and with it the wedge actuator 36, is toward the spout 24 as seen in FIGS. 1 and 8. Continuing such movement of the wedge actuator 36 allows the cold water plunger 32 to raise and gradually open the diaphragm valve 28, while the hot water plunger 30 is held down and the diaphragm valve 26 maintained closed so that hot water continues to be shut off (see FIGS. 9 and 12).

Thus, the cold water plunger cam surface 58 is forced against the cam surface 54 on the wedge actuator 36 due to the upward hydraulic pressure on the cold water diaphragm 62, and said plunger 32 moves in a longitudinal direction away from the cold water inlet port 20. Displacement of the plunger 32 longitudinally unseats the cold water diaphragm 62 from the valve seat at the inlet port 20, thereby permitting cold water to pass into the mixing chamber 22 (FIG. 12).

Similarly, when the lever 10 is moved toward the left in FIG. 2, the wedge actuator 36 will move slidably forward and to the right from the position of FIG. 4 to the position of FIG. 10, and as the wedge actuator 36 is moved cam surface 52 and 56 slide over each other, and in response to the incline of the wedge actuator cam surface 52, the hot water plunger cam surface 56 is forced to follow the incline due to the upward hydraulic pressure on the hot water diaphragm 60, and said plunger 30 will move in a longitudinal direction away from the hot water inlet port 18. Displacement of the hot water plunger 30 longitudinally unseats the hot water diaphragm 60 from the valve seat at the hot water inlet port 18, thereby gradually opening the hot water valve 26 and permitting hot water to pass into the mixing chamber 22 (FIG. 13), while the cold water inlet port 20 is held closed.

It will thus be seen that movement of the lever 10 in a first direction (forward-rearward-Y-direction) causes movement the wedge actuator 36 in one direction for actuating the plungers 30, 32 to control the flow rate of water through the hot and cold water inlet ports 18, 20.

To control the relative proportions of hot and cold water admitted through the inlet ports 18, 20 to the mixing chamber 22, the wedge actuator 36 is moved by means of the lever 10 in a second direction orthogonally related to the first direction, i.e. laterally (X-direction) as viewed in FIG. 2. Referring to FIG. 3, it will be seen that the lever 10 is pivotally movable in the forward-rearward direction, or laterally, within the confines of the triangular opening 70 in the housing 14. Accordingly, by movement of the wedge actuator 36 forward from its fully closed position shown in FIG. 4, to its substantially equal flow position shown in FIG. 8, both hot and cold valves 26, 28 are opened to an intermediate flow position. By movement of the wedge actuator laterally to the left as viewed in FIGS. 8 and 9, the hot water valve 26 is closed while the cold water valve 28 is opened from its intermediate to its fully open position; conversely any movement of the wedge member laterally to the right as from the position of FIG. 8 to the position of FIG. 10, gradually closes the cold water valve 28 while the hot water valve 26 is opened from its intermediate to its fully open position thereby providing a valve means to gradually vary the proportions of hot and cold water supplied to the mixing chamber 22.

To restrict the wedge actuator 36 from rotating while permitting planar sliding movement, so that the wedge actuator is movable either laterally or in a forward-rearward direction, and to maintain the cooperating cam surfaces on the wedge actuator and plungers in face-to-face engagement, the lever 10 is mounted in the housing 14 for pivotal movement also in lateral and forward-rearward directions. In the present case this is achieved by mounting means for the lever 10 herein shown as a ball and socket assembly 72 with a ball 74 carried on the lever 10 and through the center of which the axis of the lever 10 extends. At right angles to the axis of the lever 10 a pin 76 is provided which extends from the ball 74. The lever 10 is desirably pivotally movable in one direction (forward-rearward) about the axis of the pin 76 and for this purpose the pin is rotationally received in slots or slot-like recesses 78, 80 of the socket in which the ball 74 is journaled. These slot-like recesses 78, 80 have substantially straight walls (FIG. 19) substantially parallel to the longitudinal axis of the housing 14 and are oppositely aligned as can be seen in FIG. 2 with the lateral direction of movement of the lever 10. Accordingly, the axis of the pin 76 provides one rotational axis of the ball 74, and allows only forward-rearward pivotal movement of the lever 10 and similar movement of the wedge actuator 36, while the pivotal movement of the pin 76 in the slots 78, 80 provides a second rotational axis of the ball 74 and allows only lateral movement of the lever 10 and similar movement of the wedge actuator 36.

Finally, to insure that the movement of the wedge actuator 36 is restricted to these two directions of movement, and further carrying out the objective of preventing its rotational movement, the wedge actuator 36 is connected to the lower end of the lever 10 by the modified ball assembly 48 herein shown as having the modified ball element 82 having opposite faces received in a like shaped recess or socket 84 so that the ball is pivotable about the horizontal axis of the cylinder and about an axis normal to the cylindrical axis while the wedge is prevented from rotating relative to the modified base 82 or the lever. A vertical slot 85 extending from the recess 84 receives a pin 50 projecting from the modified ball element 82 for locating purposes. The modified ball assembly 48 including the pin 50 allows the lever 10 to pivot about a horizontal axis relative to the wedge actuator 36. Thus both the modified ball assembly 48 and the ball and socket assembly 72 function to restrict the relative movement of the connected parts; the ball and socket assembly 72, which provides means for mounting the lever 10 in the housing 14, restricts the rotational movement of the ball 74 in the socket 75 to two orthogonal rotational axes normal to the two directions (forward-rearward, lateral) directions of movement of the wedge actuator 36; the modified ball assembly 48, which provides means for transmitting the pivotal movement of the lever 10 to the wedge actuator 36, also prevents relative rotational movement of the wedge actuator 36. By virtue of its mounting in the housing 14, the lever 10 is restrained against rotation, and the wedge actuator 36 is similarly restrained against rotation by means of its connection to the lever.

Now turning to FIGS. 20-23 in addition to FIGS. 1 and 2, in keeping with a further aspect of the invention, an improved diaphragm valve construction is illustrated. While generally of the type of diaphragm valve disclosed in U.S. Pat. No. 4,203,464, in the present case the valve closure portions 86 of the diaphragms 60, 62 have a tapered raised central boss 88 which extends into the valve seats 90 of the inlet ports 18, 20. When the plungers 30, 32 are in the closed position, i.e., when the valve closure portions 86 are in direct contact with the annular valve seats 90 of the inlet ports 18, 20, the tapered boss 88 will extend inside the inner lip 92 of the annular valve seat 90. By positioning the tapered boss 88 86 inside the inner lip of the valve seat 90, it becomes possible to precisely control the flow rate of the water as the diaphragm moves relative to the valve seat. Preferably the tapered boss is frusto-conical with the sides of the boss extending at an angle X in the range of 15° to 25° to the plunger axis.

Referring to FIGS. 20-23, it will be seen that because of the taper of the boss 88, each successive longitudinal increment of movement of the plunger increases the radial clearance between the boss 88 and the inner lip 92 of the valve seat, thereby gradually increasing the effective area of the passage for water flow. This gradual increase in effective area of the passage results in a gradual change in flow rate as the plunger is displaced longitudinally.

Figure 23:
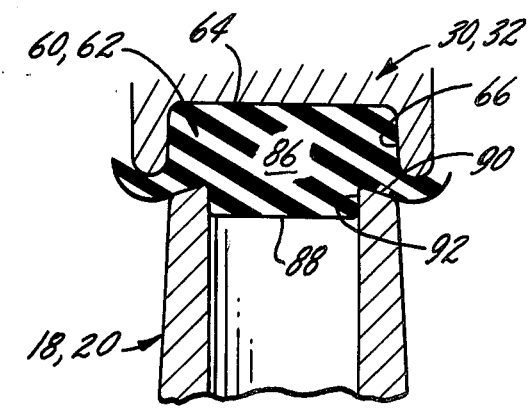
Figure 24:
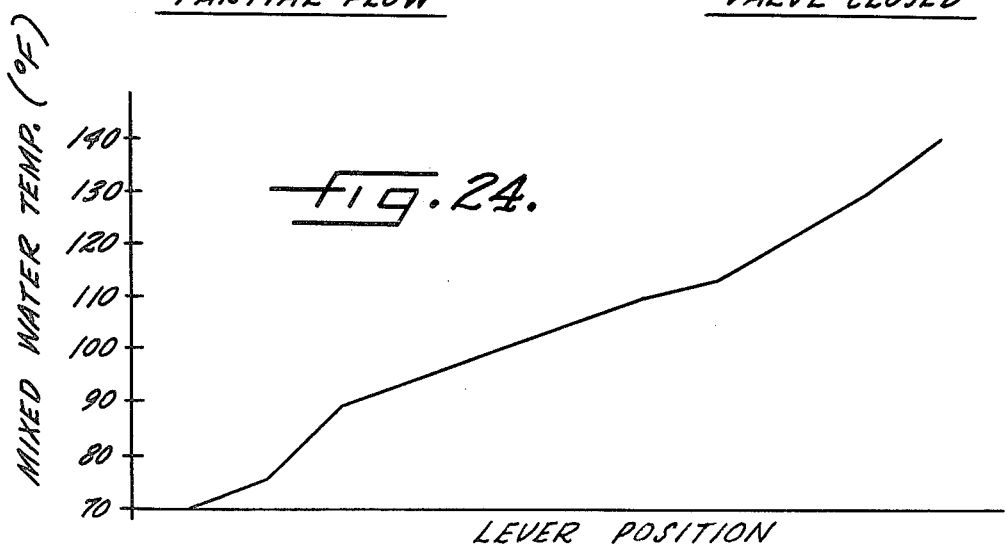
FIG. 24 is a graph of mixed water temperature characteristics of the mixing valve of this invention.

Referring to FIG. 24, this is a graph illustrating mixed water temperature produced with a working embodiment of a mixing valve construction as shown in FIGS. 1-19, with diaphragm valves having closure portions as shown in more particular detail in FIGS. 20-23. This graph shows temperature change at full flow conditions, from full flow through the cold water inlet with the hot water valve closed at the left-hand side of the graph to full flow through the hot water inlet and the cold water valve closed at the right side of the graph. Cold water temperature was about 70° while the hot water temperature was about 140°.

As shown in the graph, while the temperature change line is not absolutely linear from one end of the range to the other, the line is essentially linear. This graph is believed to demonstrate a superior temperature characteristic for diaphragm valves operating in combination in a mixing valve to control relative proportions of water flow.

While diaphragm valves having a different valve closure configuration than that disclosed herein are known, as in U.S. Pat. No. 4,203,464, and such diaphragm valves are well suited to single faucet applications, the diaphragm valve of this invention with the tapered boss valve closure portion has particular utility in mixing valve applications where more precise control over flow rate of the two valves working in combination to control mixed water temperature is desired.

When the plungers 30, 32 are in the valve closed position, the valve closure portions 86 engage the valve seats 90 and sufficient pressure is supplied to indent the bottom surfaces of the valve closure portions 86 outward of the tapered boss 88, to obtain a full seal (FIG. 23). As taught in U.S. Pat. No. 4,203,464, the area of contact should be inward of the periphery of the raised portion 64 on the top of the diaphragm which is received in the tubular end 66 of the plunger. This is to avoid pinching the thin wall section of the diaphragm extending radially to the rim where it is clamped in the housing.

The diaphragms 60, 62 are preferably made of an elastomeric material, such as EPDM rubber with a hardness range of approximately 60 durometer preferred, with the radially extending thin supporting wall 94 having convolutions such that the supporting wall rolls as the plunger moves longitudinally, and the supporting wall is backed up by the plunger and the housing walls and not subjected to a differential hydraulic pressure across the diaphragm. The rim 98 of the diaphragm is clamped between the upper and lower housing bodies (i.e. sections) 100, 102 so that the diaphragm seals the plungers and the actuating mechanism for the plungers from the water passages.

Turning again to FIGS. 1, 2 and 19, in accordance with another feature of the invention, the mixing faucet is constructed for user replacement of the rubber diaphragms, and for ease and simplicity in original installation. For this purpose, the faucet is mounted on a fixed base plate assembly 110 which as shown has integral hot and cold water supply tubing 112, 114. The base plate assembly 110 is preferably bolted in position on a mounting bracket 116. The base plate of the assembly 110 is provided with tapped holes 118 (one is shown) for bolts 120, 122 which connect the upper and lower housing bodies 100, 102 extending lengthwise through both said housing bodies and securing them to the base plate assembly 110, the bolts 120, 122 being threaded into the holes 118 in the base plate. The heads of the bolts 120, 122 are accessible through openings 124 in the top of the upper housing body 100, as shown in FIG. 19, and pass through a retainer plate 126 which also holds together the upper housing body 100 which is split along its longitudinally axis into halves 128, 130.

With the construction shown, the entire housing is made of three parts, a lower housing body 102 and the two-part upper housing or section 100. The upper housing body 100 is split along its longitudinal axis such that each respective half 128, 130 is a mirror image of the other. Providing appropriately shaped mating recesses, the lower housing body contains the vertical inlet passages and together the two housing bodies provide the mixing chamber 22 and peripheral discharge passage 131, the upper housing body 100 also providing means for supporting the plungers 30, 32 and the cam means 34 and lever 10 for operating the plungers and diaphragm valves 26, 28.

In carrying out one of the important objectives of this invention, the upper housing body or section 100 split into halves provides a structure which will avoid tolerance build-up which generally occurs when multiple part housings are stacked in one direction for assembly. It will be seen that by dividing the upper housing section along its longitudinal axis, rather than dividing valve housings, as is common, along multiple horizontal planes, provision may be made for support of all the components and assembly of the same within the housing, without dividing the housing at multiple horizontal locations. With the present structure, by separating the upper housing halves, all components may be assembled in position relative to each other. Moreover, where, as in past practice, housing structures are divided at multiple horizontal locations, the sub-structures must be contained with an outside tubular member which is anchored to the base of the faucet and held by a retaining nut. The need for such a tubular member and retaining nut is eliminated with the present construction since the longitudinal stresses, caused by hydraulic water pressure on the valve means which these parts normally would bear, are now transmitted to the outer walls of the upper housing body or section. In keeping with this aspect of the invention not only is tolerance stack-up eliminated by having a longitudinally divided upper housing section rather than stacked subsections, but the overall housing structure is simplified. As shown, the retainer plate 126 has bolts 120, 122 holding it, and the upper housing body halves 128, 130, securely to the base plate assembly 110. With the housing halves 128, 130 securely held, hydraulic pressure forces are transmitted from the valve means 16, in a longitudinal direction, through plungers 30, 32 and wedge actuator 36 to the pressure wall 148, 150 of the upper housing body or section 100. These forces place the outer walls 148, 150 in tension against the restraint the retainer plate 126 exerts against halves 128, 130 in securing the upper housing body 100 to the base plate assembly 110. Thus, by directing the hydraulic forces to the outer walls 148, 150, the upper housing body 100 becomes a load bearing or support column and totally eliminates the need for an outer tubular support member and retainer nut. The cost savings realized from the present invention comes not only from eliminating the outer tubular support member and retainer nut, but also from eliminating the need for any replacement of these parts during the life of the faucet.

Figure 17:
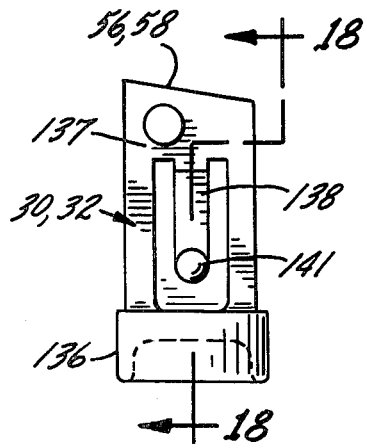
FIG. 17 is a side view of a valve plunger showing the retainer detent and tubular recess in one end.
Figure 18:
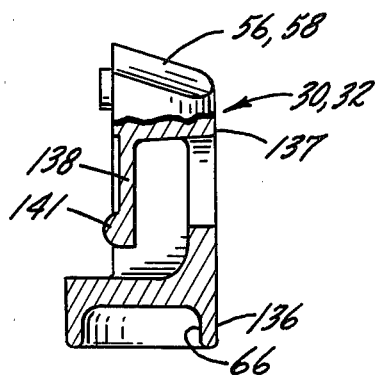
FIG. 18 is a partial sectional view of a valve plunger showing the retainer detent, the tubular recess, and a flat cam surface at one end taken from FIG. 17 along line 18—18.
Figure 19:
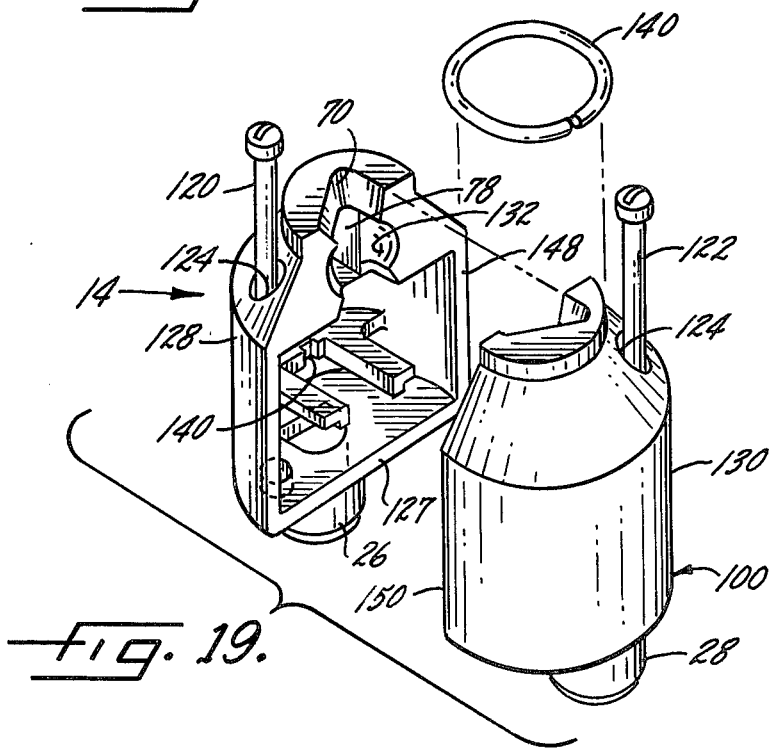
FIG. 19 is an exploded assembly drawing showing some of the components of the upper housing body.
Figure 20:
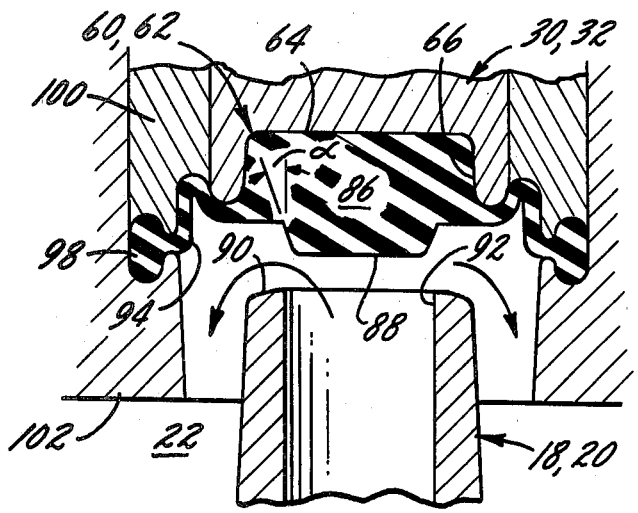
FIGS. 20-23 are enlarged fragmentary sectional views of a plunger and diaphragm, showing the diaphragm valve in different positions from fully open to fully closed.
Figure 21:
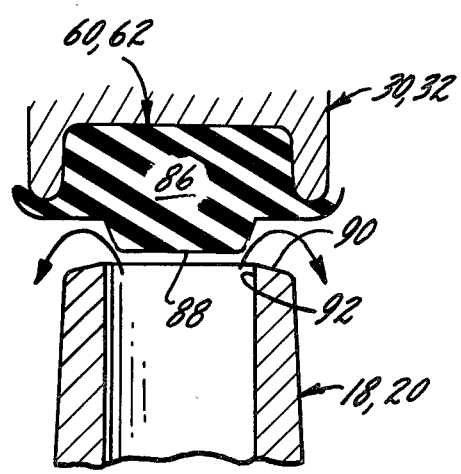
Figure 22:
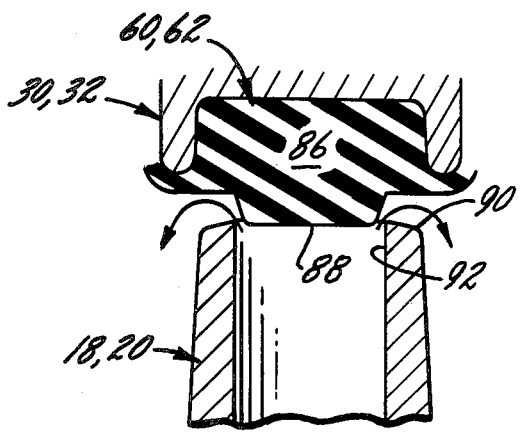

Referring in more detail to FIGS. 1-3 and 14-19, the halves 128, 130 of the upper housing body 100 when joined together provide the triangular opening 70 through which the lever 10 extends from the housing. The upper housing halves 128, 130 also have mating recesses 132 (one is shown in FIG. 19) providing a socket for the ball 74 carried by the lever 10 together providing a ball and socket assembly 72 for pivotally mounting the lever 10 in the housing 14. In each halve 128 or 130 of the upper housing body 100, one of the valve plungers 30 or 32 is mounted. Referring to FIGS. 17 and 18, one plunger is illustrated having a tubular end 66 for receiving the raised portion 64 on the top of the valve diaphragm, and a body portion 137 which is hollowed out to reduce weight and eliminate material. A guide element 138 projects from the body 137 of the plunger 30 which rides in a slot 140 in the upper housing body 100 to guide the plunger in its longitudinal movement. The guide element 138 has an enlarged lower end 141 which serves as a detent to hold the plunger within and prevent inadvertent removal from one of the upper housing body halves 128 when the upper housing body is disassembled. In addition to the retainer plate 126 which locks the halves 128, 130 of the upper housing body together, when the upper housing body 100 is assembled onto the lower housing body 102 and fastened in position by means of the bolts 120, 122, the top of the upper housing body is secured by means of a resilient ring 140 which connects the upper housing body halves 128, 130 together and applies pressure via the walls of the recesses 132 against the ball 74. In the final assembled condition, a slight clearance must exist between the facing walls of the two halves 128, 130 of the upper housing body so that the resilient ring 140 will be effective to apply pressure against the ball. This pressure remains continuous as the ball 74 and socket 132 wear through normal use. This continuous pressure applied on the ball 74 is such that the lever 10 is stabilized in the housing and the lever 10 will have a positive feel to it when moved in position as well as remaining stationary once the desired setting has been made. In other words, the pressure applied to the ball 74 causes a small frictional resistance against movement of the ball 74 in its socket, and thus resistance to movement of the lever 10 from position to position to adjust the flow rate or temperature of the inlet water. The resistance, however, is very small and not such as to interfere with the ability of a user applying small force to smoothly reposition the lever to change the setting of flow rate or water temperature.

In completing the assembly of the single lever mixing faucet on the base plate assembly 110, the spout 24 is slid over the lower housing body 102, and as will be seen in FIGS. 1 and 2, is mounted thereon so as to swivel. The dome 12 is slipped over the lever and upper housing body 100 and is screwed into position on the exterior screw threads 142 provided on the lower housing body. As a final step, the operating handle 144 is fastened onto the lever 10.

I claim:

1. A single lever faucet comprising a housing having inlet means for cold and hot water and a mixing chamber, outlet means, individual cold and hot water valve means for controlling water flow from said inlet means to said mixing chamber including parallel plungers slidably mounted in said housing for controlled displacement to actuate said valve means,
   lever means having one end extending from said housing mounted in said housing for pivotal movement in two orthogonally related directions and combinations thereof,
   cam means for displacing said plungers, said cam means comprising a wedge actuator connected to be moved in said two directions and combinations thereof by said lever means upon movement of said one end of said lever means extending from said housing,
   mounting means in said housing for said wedge actuator, said mounting means permitting planar sliding movement transverse to the axis of said plungers in said two directions and combinations thereof responsive to pivotal movement of said lever means, said wedge actuator having sliding movement in one direction for adjusting the volume of water flow by said valve means and in an orthogonal direction for adjusting relative proportions of water flow by said valve means, said wedge actuator being restrained against rotation,
   said wedge actuator having substantially flat cam surfaces respectively engaging the ends of said plungers,
   said respective cam surfaces being inclined in said two directions, being similarly inclined in said volume adjusting direction and oppositely inclined in said proportion adjusting direction,
   the ends of said plungers being in face-to-face contact with said cam surface.

2. A single lever faucet mixing faucet as described in claim 1 including a ball and socket assembly for movably mounting said lever in said housing and means for mounting said ball so that its rotational movement in said socket is restricted to two orthogonal rotational axis normal to said two directions of movement of said wedge actuator, and pivotal movement of said lever means is restricted to said two directions.

3. A single lever mixing faucet as described in claim 2, said housing having an upper housing body and lower housing body and including fastening means connecting said upper housing body to said lower housing body extending lengthwise through both said housing bodies.

4. A single lever mixing faucet as described in claim 3, said upper housing body being split along its longitudinal axis such that each respective half is a mirror image of the other, mating recess in said housing halves providing a socket for said ball, and removable means for connecting said housing halves together.

5. A single lever mixing faucet as described in claim 3, said removable means including a resilient means connecting said upper housing body halves and applying pressure via the recess walls against said ball, such pressure remaining continuous as said ball and socket wear through normal use.

6. A single lever mixing faucet as described in claim 3, said housing providing a recess,
   a ball carried on said lever means spaced from said one end with said ball in said recess providing said ball and socket assembly to mount said lever,
   said housing defining a substantially triangular opening through which said lever means extends restricting the pivotal movement of said lever means by engagement with the edges of said opening.

7. A single lever mixing faucet as described in claim 6 including a modified ball on the opposite end of said lever means,
   a recess provided in said wedge actuator for rotationally receiving said modified ball providing a modified ball assembly, pivotal movement of said lever in said two directions without the restraints of said triangular opening causing said opposite end of said lever means and said modified ball to impart planar movement to said wedge actuator in said two directions.

8. A single lever faucet as described in claim 6, including means associated with said housing for applying pressure via the walls of said recess against the ball of said assembly, and providing means for stabilizing said lever means.

9. A single lever mixing valve assembly as described in claim 6, said housing recess having curved walls for receiving said ball, said recess also having opposite slot-like extensions with substantially straight walls substantially parallel to the longitudinal axis of said housing and oppositely aligned with one of said directions of movement, said ball having a pin running through its center and extending outward from either side of said ball and being both pivotally and rotationally movable in said slot-like extensions in response to movement of said lever means, the axis of said pin providing one rotational axis of said ball and the pivotal movement of said pin providing a second rotational axis of said ball orthogonal to the first axis.

10. A single lever mixing faucet as described in claim 1, said lever means being pivotally mounted in said housing,
    said housing defining a substantially triangular opening through which said lever means extends restricting the movement of said lever means by engagement with the edges of said opening,
    means for translating the pivotal movement of said lever means in said two directions into planar movement of said wedge actuator in said two directions including
    a socket provided in said housing at a fixed location,
    a ball carried on said lever means spaced from one end and rotatably mounted in said socket, means journaling said ball to rotate in said socket and limiting the rotation of said ball to said two directions, a second socket provided in said wedge actuator, a modified ball fixed on the opposite end of said lever means and received in said wedge actuator socket, pivotal movement of said lever in said two directions within the restrictions of said triangular housing opening causing the opposite end of said lever means to impart planar movement to said wedge actuator through said modified ball assembly.

11. A single lever faucet according to claim 1 wherein said ends of said plungers are substantially flat.

12. A single lever mixing valve according to claim 1 wherein a connection to said lever means restrains said wedge actuator against rotation.

13. A single lever faucet adapted to be mounted on a base, comprising:

housing means having an inlet means for fluid and an outlet means for fluid, valve means in said housing for controlling fluid flow from said inlet means to said outlet means, a lever, means for actuating said valve means responsive to movement of said lever, said housing means having an upper housing section split along its longitudinal axis providing two substantially identical axis providing two substantially identical halves, each having longitudinally extending outer walls, means providing a pivotal support for said lever, including mating recesses in said halves forming a socket, and a member pivotably mounted in said socket, retainer means cooperating with the lower end of said upper housing section for retaining said upper section to said base, means for holding said housing halves in face-to-face contact, and means for transmitting forces from inlet fluid acting on said valve means to said outer walls of said upper housing section thereby placing said well in tension against the restraint exerted by said retainer means to retain said housing section on said base.

* * * * *